United States Patent
Chiba

(10) Patent No.: US 10,574,809 B2
(45) Date of Patent: Feb. 25, 2020

(54) MOBILE PHONE

(71) Applicant: KYOCERA Corporation, Kyoto (JP)

(72) Inventor: Atsuo Chiba, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/885,860

(22) Filed: Feb. 1, 2018

(65) Prior Publication Data

US 2018/0227409 A1    Aug. 9, 2018

(30) Foreign Application Priority Data

Feb. 6, 2017  (JP) ................. 2017-019215

(51) Int. Cl.
| | | |
|---|---|---|
| H04M 1/725 | (2006.01) | |
| G06F 3/16 | (2006.01) | |
| G10L 15/08 | (2006.01) | |
| G10L 25/78 | (2013.01) | |
| G10L 15/22 | (2006.01) | |

(52) U.S. Cl.
CPC ........ *H04M 1/72569* (2013.01); *G06F 3/167* (2013.01); *G10L 15/08* (2013.01); *G10L 15/22* (2013.01); *G10L 25/78* (2013.01); *G10L 2015/088* (2013.01); *H04M 2201/40* (2013.01); *H04M 2250/12* (2013.01)

(58) Field of Classification Search
CPC ......... H04M 1/72569; H04M 2201/40; H04M 2250/12; G06F 3/167; G10L 15/08; G10L 15/22; G10L 25/78; G10L 2015/088
See application file for complete search history.

(56) References Cited

U.S. PATENT DOCUMENTS

| | | | | |
|---|---|---|---|---|
| 8,428,568 | B1 * | 4/2013 | Kim ...................... | H04M 3/02 455/415 |
| 8,781,105 | B1 * | 7/2014 | Duva .................. | G06Q 30/0246 379/201.01 |
| 9,596,340 | B2 | 3/2017 | Noda | |
| 2012/0323679 | A1 * | 12/2012 | Yang .................. | G06Q 30/0241 705/14.49 |
| 2016/0072944 | A1 | 3/2016 | Noda | |
| 2016/0191709 | A1 * | 6/2016 | Pullamplavil ....... | H04M 3/5133 379/266.07 |

FOREIGN PATENT DOCUMENTS

WO    2014/185422 A1    11/2014

* cited by examiner

*Primary Examiner* — Mohammed Rachedine
(74) *Attorney, Agent, or Firm* — Studebaker & Brackett PC

(57) ABSTRACT

A mobile phone that can improve the convenience is provided. A mobile phone includes a communication interface configured to transmit and receive a signal, a touchscreen display, and a controller configured to, when the communication interface receives a predetermined signal indicating a keyword during a call, display an operation target object corresponding to the signal on the touchscreen display.

4 Claims, 7 Drawing Sheets

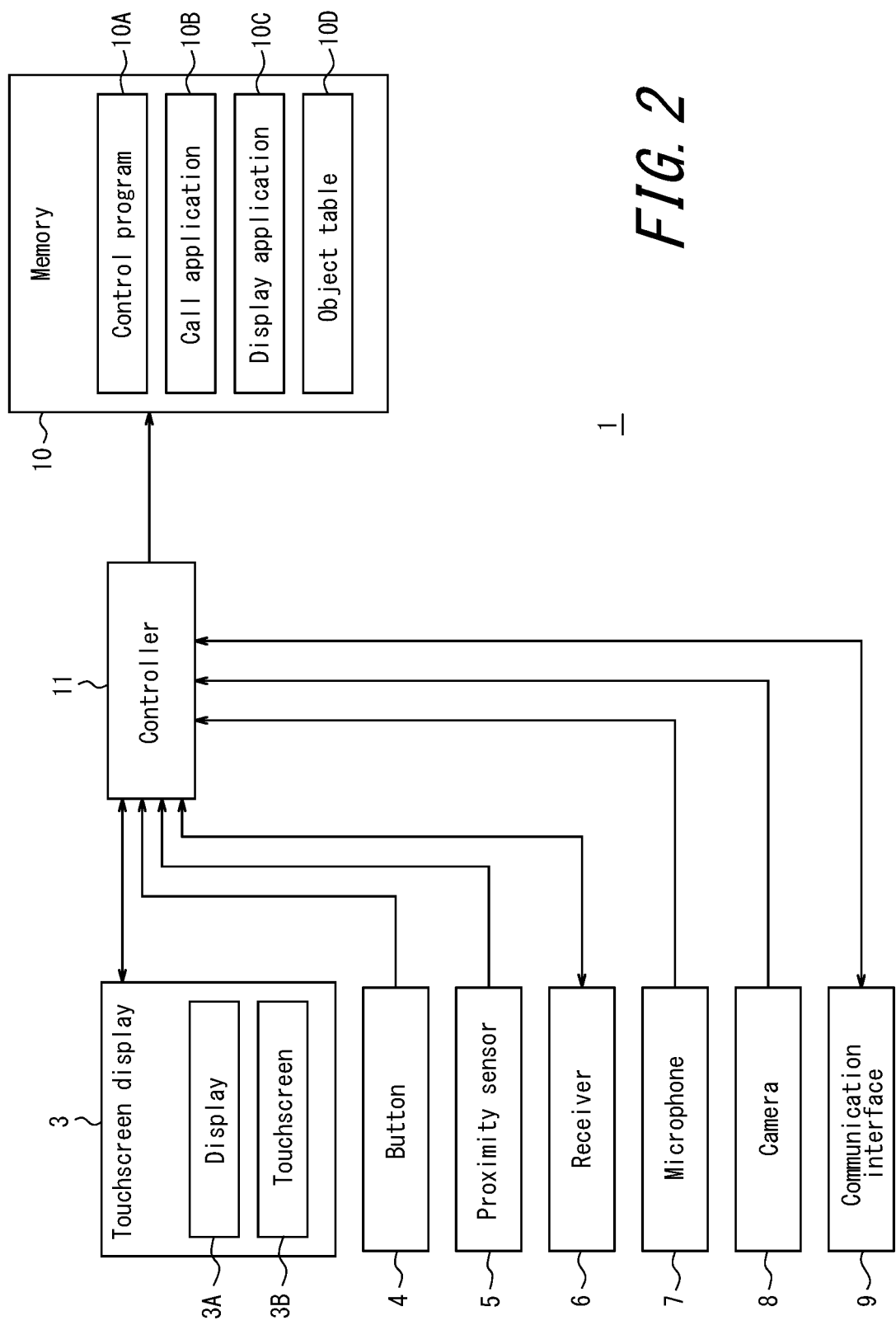

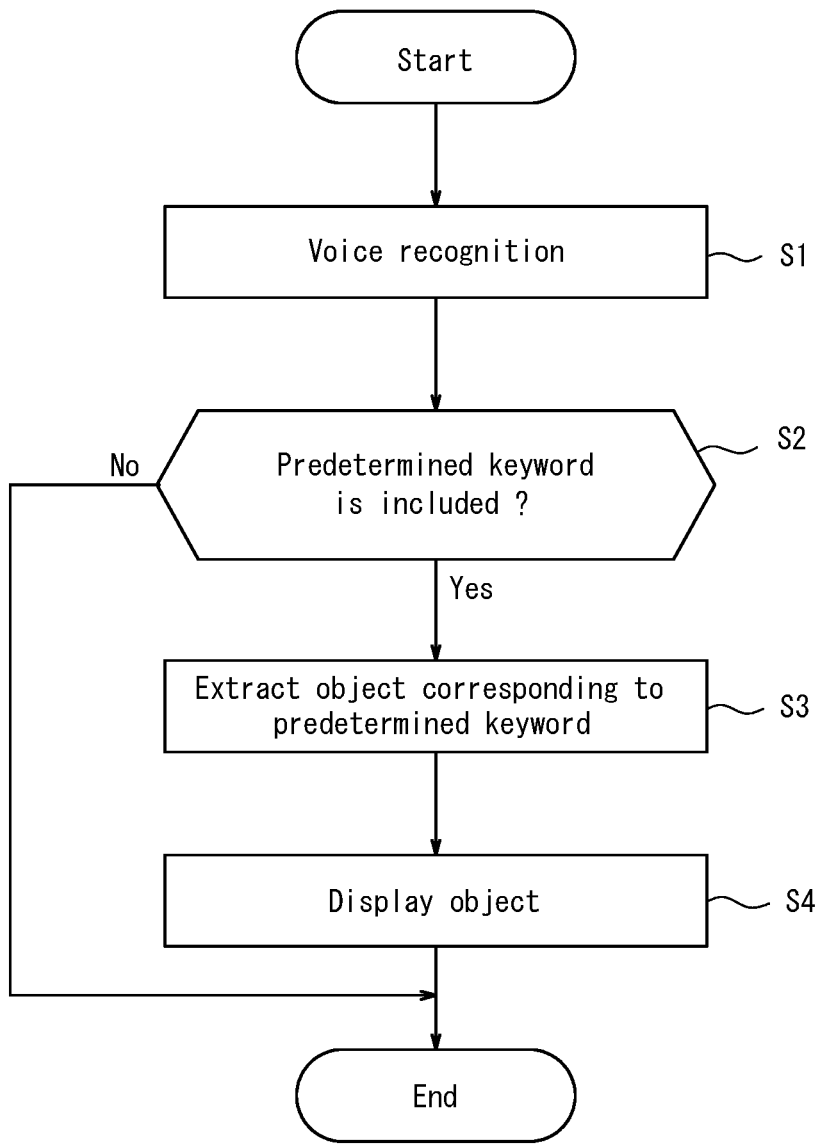

MOBILE PHONE

CROSS-REFERENCE TO RELATED APPLICATION

The present application claims priority to and the benefit of Japanese Patent Application No. 2017-019215 filed Feb. 6, 2017, the entire contents of which are incorporated herein by reference.

TECHNICAL FIELD

The present disclosure relates to a mobile phone.

BACKGROUND

A conventionally known mobile phone such as a smartphone may be configured to display an operation target object in a display and detect a user operation made in respect of the object.

SUMMARY

A mobile phone according to the present disclosure includes a communication interface configured to transmit and receive a signal, a touchscreen display, and a controller configured to, when the communication interface receives a signal indicating a predetermined keyword during a call, display an operation target object corresponding to the signal on the touchscreen display.

BRIEF DESCRIPTION OF THE DRAWINGS

In the accompanying drawings:

FIG. 2 is a functional block diagram illustrating the mobile phone illustrated in FIG. 1.

FIG. 5 is a flowchart illustrating operation of the mobile phone illustrated in FIG. 1.

DETAILED DESCRIPTION

The mobile phone described above displays a screen for various settings in accordance with a user operation. However, it would be more convenient if a mobile phone appropriately displayed an operation target object desired by a user.

The present disclosure aims to provide a mobile phone that improves convenience.

An embodiment of the present disclosure is capable of improving convenience.

Hereinafter, an embodiment of the present disclosure will be described with reference to the accompanying drawings.

Figure 1:
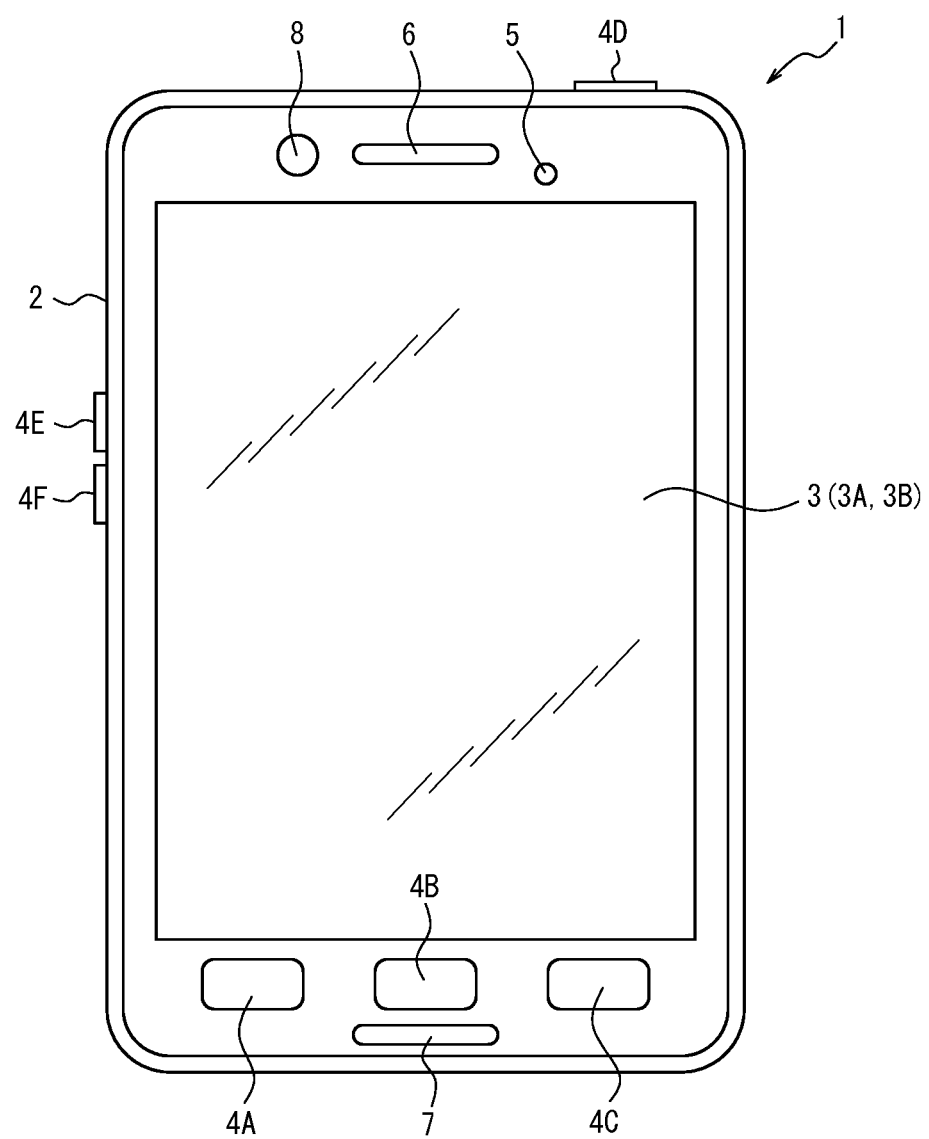
FIG. 1 is an external view of a mobile phone according to an embodiment.

Referring to FIG. 1 and FIG. 2, first, a configuration of a mobile phone according to the present embodiment will be described. FIG. 1 is an external view of the mobile phone according to the present embodiment. FIG. 2 is a functional block diagram illustrating the mobile phone illustrated in FIG. 1.

As illustrated in FIG. 1, the mobile phone 1 according to the present embodiment is a smartphone (hereinafter, referred to as a "smartphone 1") and includes a housing 2, a touchscreen display 3, buttons 4A to 4F, a proximity sensor 5, a receiver 6, a microphone 7, and a camera 8. The touchscreen display 3, the buttons 4A to 4C, the proximity sensor 5, the receiver 6, the microphone 7, and the camera 8 are arranged on a front side of the housing 2 in FIG. 1. Also, the buttons 4D to 4F are arranged on lateral sides of the housing 2 in FIG. 1. Hereinafter, the buttons 4A to 4F may be collectively referred to as buttons 4 rather than specified individually. Although the mobile phone 1 according to the present embodiment is the smartphone 1, the mobile phone 1 is not limited thereto and may be, for example, a tablet having a call function.

As illustrated in FIG. 2, the smartphone 1 according to the present embodiment also includes a communication interface 9, a memory 10, and a controller 11, in addition to the touchscreen display 3, the buttons 4, the proximity sensor 5, the receiver 6, the microphone 7, and the camera 8.

The controller 11 is, for example, a CPU (Central Processing Unit). The controller 11 may be an integrated circuit such as SoC (System-on-a-chip) in which other functional elements including the communication interface 9 are integrated. The controller 11 may be configured with a combination of a plurality of integrated circuits. The controller 11 implements various functions by centrally controlling operation of the smartphone 1. Operation of the controller 11 will be described in detail later.

The touchscreen display 3 includes a display 3A and a touchscreen 3B. The display 3A includes a display such as an LCD (Liquid Crystal Display), an organic EL panel (Organic Electro-Luminescence panel), or an inorganic EL panel (Inorganic Electro-Luminescence panel). The display 3A displays characters, images, symbols, shapes, and so on. The display 3A receives data necessary for its display from the controller 11. The display 3A may appropriately include a backlight and so on.

The touchscreen 3B detects contact made by a user's finger or a stylus pen that is operating the touchscreen display 3. The touchscreen 3B may detect positions of contact made by a plurality of fingers or stylus pens on the touchscreen 3B. For this detection, the touchscreen 3B may employ any method including a capacitive method, a resistive film method, a surface acoustic wave method (or an ultrasound method), an infrared method, an electromagnetic induction method, and a load detection method. The touchscreen 3B that employs the capacitive method is capable of detecting contact and approach made by the finger, the stylus pen, and so on. A signal detected by the touchscreen 3B is supplied to the controller 11.

As described above, the touchscreen display 3 includes the display 3A and the touchscreen 3B. The display 3A displays characters, images, symbols, and shapes. The display 3A also displays various objects. For example, the display 3A may display objects such as keys, buttons, and icons. An object such as a key or a button for indicating to the user an area (a position) where an input operation should be made is hereinafter referred to as an "operation target object". The touchscreen 3B detects an operation in respect of the smartphone 1 by detecting contact made to the operation target object. The controller 11 cooperates with the touchscreen 3B and thus detects operation to the touchscreen 3B (the touchscreen display 3).

The buttons 4A to 4F are operated by the user. Operations in respect of the buttons 4A to 4F are detected by the controller 11. The operations in respect of the buttons 4A to 4F may include, for example, single-click, double-click, push, long-push, multiple-push.

For example, the buttons 4A to 4C may be a home-button, a back-button, and a menu-button. According to the present embodiment, the buttons 4A to 4C are touchsensor buttons. The buttons 4A to 4C are not limited to touchsensor buttons and may be, for example, push-buttons. For example, the button 4D may be a button for powering on and off the smartphone 1. The button 4D may also serve as a sleep/sleep-cancel button. For example, the buttons 4E and 4F may be volume control buttons.

The proximity sensor 5 detects a nearby object in a contactless manner. For example, the proximity sensor 5 detects that the user of the smartphone 1 has moved the touchscreen display 3 close to the ear of the user to make a call. The proximity sensor 5 may output a detection signal when, for example, a predetermined object approaches the proximity sensor 5 within a predetermined distance. Also, the proximity sensor 5 may output, for example, a detection signal corresponding to a distance between the proximity sensor 5 and the predetermined object. The signal detected by the proximity sensor 5 is transmitted to the controller 11.

The receiver 6 outputs, as a voice, a voice signal transmitted from the controller 11. The smartphone 1 may include a speaker in place of the receiver 6. When the smartphone 1 executes the call function, the receiver 6 may output a voice of an opposite party.

The microphone 7 converts a voice of the user into a voice signal. The voice signal converted by the microphone 7 is transmitted to the controller 11. When the smartphone 1 executes the call function, the voice of the user of the smartphone 1 may be input to the microphone 7.

The camera 8 captures an image in front of the housing 2 illustrated in FIG. 1. The camera 8 may be arranged on a rear side of the housing 2 opposite to the front side illustrated in FIG. 1 to capture an image behind the housing 2. Data captured by the camera 8 is supplied to the controller 11.

The communication interface 9 transmits and receives signals by performing radio communication. The communication interface 9 may perform the communication by employing a communication method in conformity with a wireless communication standard. Examples of appropriate wireless communication standards are 2G (2nd Generation), 3G (3rd Generation), and 4G (4th Generation), for example. Further examples of appropriate wireless communication standards are LTE (Long Term Evolution), W-CDMA, CDMA2000, PDC, GSM® (GSM is a registered trademark in Japan, other countries, or both), and PHS (Personal Handy-phone System). Further, wireless communication standards such as WiFi (The standard for Wireless Fidelity), WiMAX (Worldwide Interoperability for Microwave Access), IEEE802.11, Bluetooth® (Bluetooth is a registered trademark in Japan, other countries, or both), IrDA (Infrared Data Association), and NFC (Near field radio communication) may be used. The communication interface 9 may support one or more of the communication standards mentioned above.

The communication interface 9 may transmit a voice signal to another telephone device and receive a voice signal transmitted from the another telephone device on the basis of control performed by the controller 11.

The memory 10 stores programs and data. The memory 10 is also used as a working region to provisionally store the results of processing performed by the controller 11. The memory 10 may include any storage device such as a semiconductor storage device or a magnetic storage device. The memory 10 may include a plurality of different types of the storage devices. The memory 10 may include a combination of a portable storage media such as a memory card and a storage medium reader.

The memory 10 stores, for example, a control program 10A, a call application 10B, and a display application 10C. An application program is abbreviated as an "application" hereinafter.

The control program 10A is a program which causes the smartphone 1 to execute various functions. In particular, the controller 11 executes various functions under the control program 10A by controlling, for example, the communication interface 9, the receiver 6, and the microphone 7.

The call application 10B is application that enables the smartphone 1 to cause the controller 11 to perform various call functions such as initiation of a call, reception of an incoming call, an ongoing call, and display of a screen on the basis of operation made during a call.

The display application 10C is application for causing the controller 11 to execute an object display function to display an operation target object during the performance of the call function on the call application 10B.

The memory 10 further stores an object table 10D. The object table 10D stores data associating predetermined keywords and operation target objects. The controller 11 outputs data of the object to the display 3A and causes the display 3A to display the data. The touchscreen 3B detects contact made to a region displaying the object and outputs a detection signal to the controller 11.

Referring now to FIG. 3, operation of the smartphone 1 according to the present embodiment will be described. Here, a function performed by the controller 11 to display a predetermined object in the display 3A under a predetermined condition during a call executed by the communication interface 9 will be described.

Figure 3A:
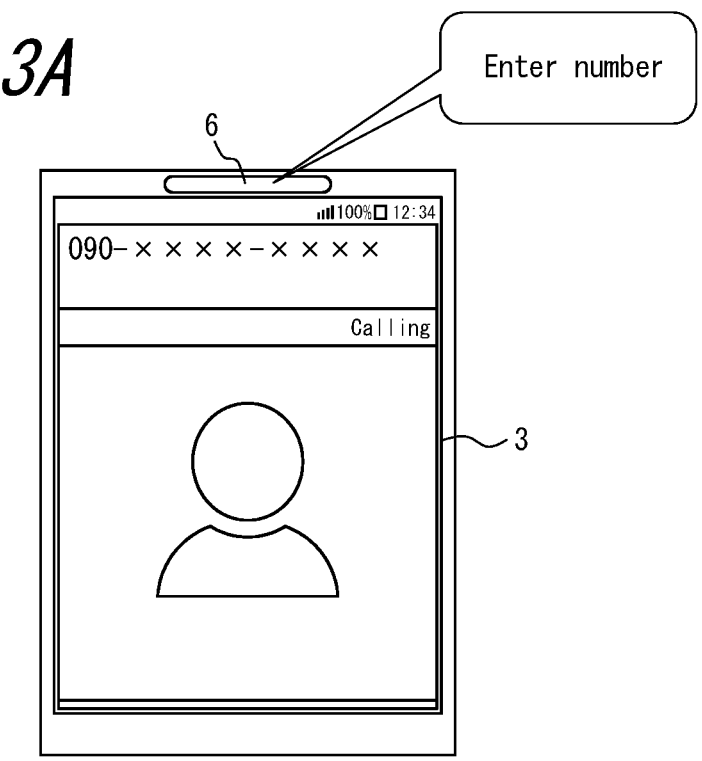
FIG. 3A and FIG. 3B are diagrams each illustrating an example of a screen displayed on a touchscreen display of the mobile phone illustrated in FIG. 1.

When the communication interface 9 starts communication for a call, the controller 11 displays a screen including a telephone number of an opposite party and an image associated with the opposite party on the touchscreen display 3 as illustrated in FIG. 3A. During the call, the controller 11 outputs a voice signal received by the communication interface 9 as a voice via the receiver 6. Also, during the call the controller 11 transmits a voice input via the microphone 7 as a voice signal from the communication interface 9. This enables the user of the smartphone 1 to hear the voice of the opposite party from the receiver 6 and speak to the opposite party via the microphone 7. This operation may be performed similarly to a call function of conventional smartphones or mobile phones, and thus a detailed description thereof will be omitted.

Figure 3B:
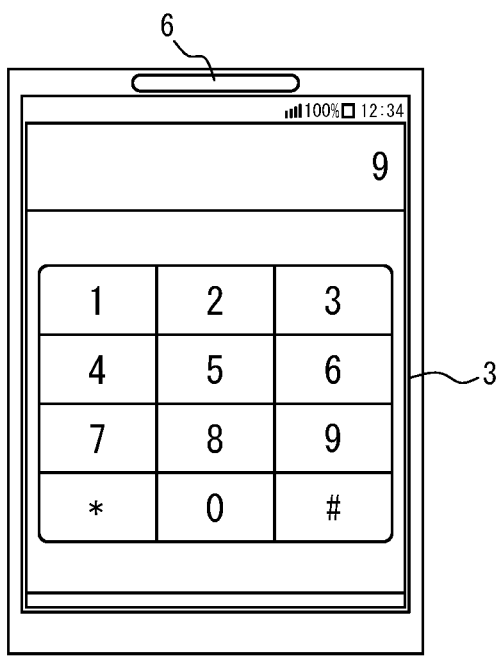

The following is a description of an example in which the opposite party in a call initiated by the user of the smartphone 1 is an automated voice guidance. Further, as a typical example of an operation according to the present embodiment, it is assumed that the automated voice guidance requires the user of the smartphone 1 to enter a predetermined number and so on during the call. According to the present embodiment, when the communication interface 9 receives a signal indicating a predetermined keyword during the call, the controller 11 causes the touchscreen display 3 to display an operation target object corresponding to the signal as illustrated in FIG. 3B. FIG. 3B illustrates an example in which the communication interface 9 receives a predetermined keyword associated with a "number" during the call and the user is required to enter a predetermined number. In FIG. 3B, the operation target object displayed in association with the signal indicating the predetermined keyword is an object of a keypad.

According to the present embodiment, the "signal indicating a predetermined keyword" mentioned above is a signal that requires the user to enter information by operating the touchscreen display 3. The signal indicating the predetermined keyword is a signal indicating a keyword in a sentence such as "enter a number", "enter one", or "enter the hash key". Alternatively, the signal indicating the predetermined keyword may be a signal indicating a keyword such as "number", "one", "hash key", or "enter". The signal indicating the predetermined keyword may be an automated voice signal. The predetermined signal may be a signal corresponding to the automated voice, a text signal converted from, for example, the automated voice, or a signal indicating identification information that allows identification of a voice signal.

In particular, when the communication interface 9 receives the voice signal, the controller 11 performs voice recognition and determines whether the signal indicates the predetermined keyword. In particular, the controller 11 may convert the voice signal into information of any type that may be recognized by the controller 11, such as text format information. On the basis of the text format information, the controller 11 may determine whether the signal indicates the predetermined keyword.

When determining that the signal indicates the predetermined keyword, the controller 11 causes the touchscreen display 3 to display the operation target object corresponding to the signal indicating the predetermined keyword. For example, the controller 11 extracts the operation target object associated with the signal indicating the predetermined keyword from the object table 10D. Then, the controller 11 displays the operation target object in the touchscreen display 3.

Figure 4:
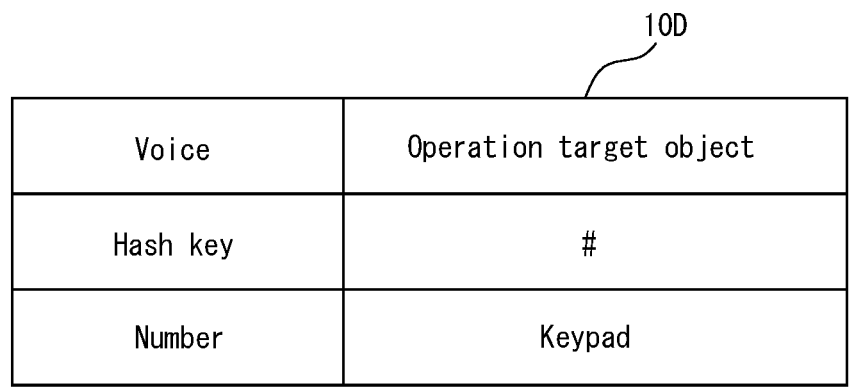
FIG. 4 is a diagram illustrating an example of data saved as an object table illustrated in FIG. 2.

In one example, as illustrated in FIG. 4, the object table 10D in the memory 10 includes predetermined keywords indicated by received signals and the operation target objects associated therewith. In particular, the predetermined keyword "hash" is associated with the operation target object "#".

That is, when, for example, the communication interface 9 receives the voice signal that indicates the "hash", the controller 11 displays the object "#" in the touchscreen display 3. In this case, the controller 11 may display an image that includes the object "#" and an object of a numerical keypad, e.g., the keypad mentioned above. The controller 11 may display the keypad that includes the object "#" and the object of the numerical keypad in which a state (e.g., color) of the object "#" is different from a state (e.g., color) of the numerical keypad. The controller 11 may display the object "#" alone without the object of the numerical keypad. When the controller 11 displays the object "#" alone, the controller 11 may display the object "#" larger than the object "#" included in the object of the numerical keypad.

As illustrated in FIG. 4, the predetermined keyword "number" is associated with the operation target object "numerical keypad". In this case, when the controller 11 determines that the predetermined keyword associated with the signal received by the communication interface 9 is a "number", the controller 11 extracts the operation target object "numerical keypad". Then, the controller 11 displays a screen that includes the object of the numerical keypad in the touchscreen display 3 as illustrated in FIG. 3B.

As described above, an object is displayed upon receipt of a signal indicating a predetermined keyword that requires the user to perform an operation. Thus, the user may promptly perform the operation in respect of the object. Also, the user may perform the operation without becoming confused about how to display the object during a call. Thus, it is more convenient for the user.

After displaying the operation target object, the controller 11 stops performing voice recognition. Thus, the controller 11 may reduce the load necessary for performing voice recognition after displaying the object.

Next, the operation of the smartphone 1 according to the present embodiment will be described with reference to FIG. 5. The controller 11 starts the operation illustrated in FIG. 5 when the communication interface 9 receives the voice signal. At this point, the user is on a call, and the touchscreen display 3 displays a call screen indicating that the user is on the call, as illustrated in FIG. 3A.

As illustrated in FIG. 5, the controller 11 first performs the voice recognition on the voice signal received by the communication interface 9 (step S1).

The controller 11 determines whether the information in the form converted from the voice signal by the voice recognition at step S1 includes the predetermined keyword (step S2).

When determining that the predetermined keyword is included at step S2, the controller 11 extracts the operation target object corresponding to the predetermined keyword from the object table 10D (step S3).

Referring back to FIG. 5, when the operation target object is extracted at step S3, the controller 11 displays the operation target object in the touchscreen display 3 (step S4). Accordingly, the smartphone 1 displays the operation target object as illustrated in FIG. 3B and allows a user operation thereto.

According to the smartphone 1 of the present embodiment, as described above, when the communication interface 9 receives the signal indicating the predetermined keyword during a call, the controller 11 displays the operation target object corresponding to the signal in the touchscreen display 3. Typically, the user is required to perform an operation in respect of the operation target object when the voice signal received by the communication interface 9 includes the predetermined keyword. In particular, in response to an announcement such as "enter a number" or "press the hash key", the user performs operation to the operation target object. As such, the smartphone 1 displays, without user operation, the operation target object necessary for the user. Accordingly, the user may promptly perform an operation in respect of the operation target object during the call on the smartphone 1 without becoming confused. That is, it is more convenient for the user.

According to the smartphone 1 of the present embodiment, when the communication interface 9 receives the automated voice signal during the call, the controller 11 may display the operation target object corresponding to the signal. Typically, the user is required to perform an operation in respect of the operation target object when the communication interface 9 receives the automated voice signal. In this case, therefore, the controller 11 displays the operation target object such that a necessary object is displayed at more appropriate timing for the user. That is, it is more convenient for the user.

According to the smartphone 1 of the present embodiment, when the communication interface 9 receives the automated voice signal during the call, the controller 11 may display the operation target object corresponding to the signal. That is, when the communication interface 9 receives a voice signal or a signal in any form corresponding to a voice, the controller 11 may display the operation target object. In this case, similarly to the case in which the communication interface 9 receives the predetermined voice signal, a necessary object is displayed at more appropriate timing for the user.

The above embodiment describes a typical example, and it should be apparent to those who are skilled in the art that various changes and substitutions may be implemented within the spirit and scope of the present disclosure. Accordingly, the present disclosure should not be construed as limited to the above embodiment but may be altered or changed in various manners without departing from the scope of the claims. For example, a plurality of constituent blocks in the above embodiment may be combined together, or one constituent block may be separated.

Figure 6A:
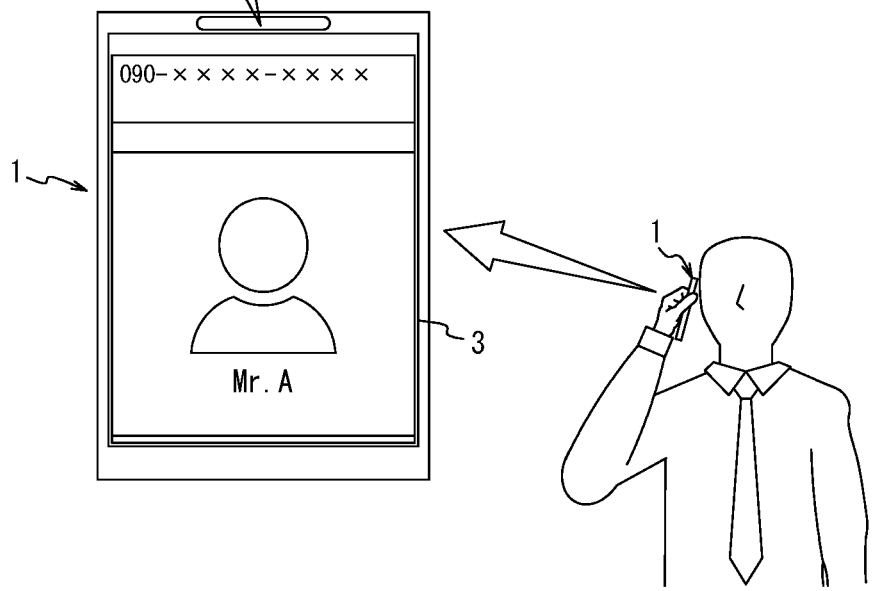
FIG. 6A and FIG. 6B are conceptual diagrams illustrating scenes in which the mobile phone illustrated in FIG. 1 is used.
Figure 6B:
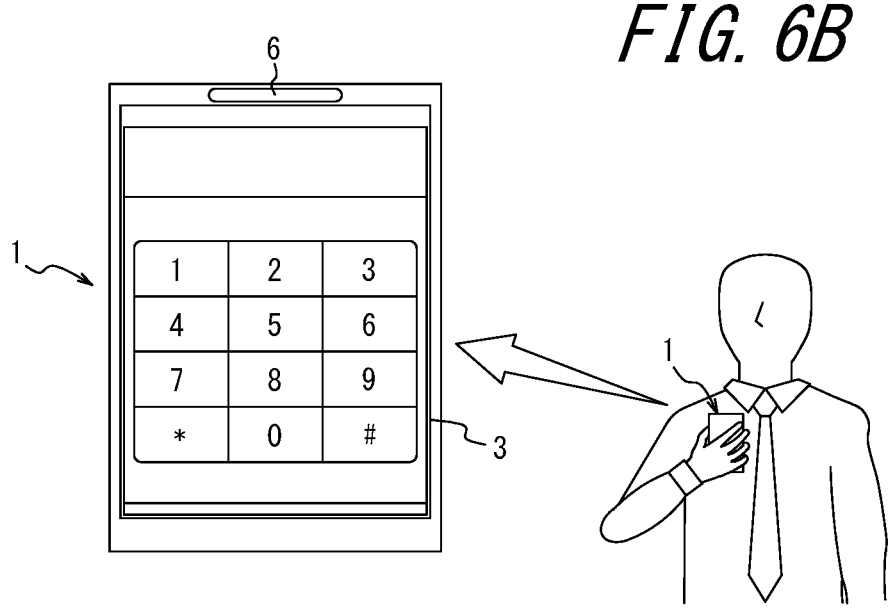

For example, when determining that the signal indicates the predetermined keyword, the controller 11 may control the display of the operation target object on the basis of the detection by the proximity sensor 5. In particular, even when determining that the signal indicates the predetermined keyword, the controller 11 does not display the operation target object if an object such as the user's ear is detected close to the touchscreen display 3 by the proximity sensor 5 as illustrated in FIG. 6A. When determining that the signal indicates the predetermined keyword, the controller 11 displays the operation target object under the condition that the object such as the user's ear is not detected close to the touchscreen display 3 by the proximity sensor 5 as illustrated in FIG. 6A.

Typically, when the user is talking on the phone holding the smartphone 1 close to the ear, the user is not trying to perform operations in respect of the touchscreen display 3. In other words, when the smartphone 1 is not held close to the ear during the call performed by the communication interface 9, the user may be trying to perform some operation to the touchscreen display 3. Accordingly, there is a high probability that, by displaying an operation target object when an object is not detected by the proximity sensor 5, an object necessary for the user is displayed at more appropriate timing for the user. That is, it is more convenient for the user.

The controller 11 may perform the voice recognition mentioned above on the basis of the voice input to the microphone 7. In particular, when the voice of the user of the smartphone 1 is input to the microphone 7, the controller 11 does not perform the voice recognition. That is, when the voice is input to the microphone 7, the controller 11 does not perform the processing to determine whether the signal received by the communication interface 9 is the predetermined signal. In this case, accordingly, the controller 11 does not display the operation target object on the touchscreen display 3.

When the voice is input to the microphone 7, i.e., when it is considered that the user is talking on the phone, the user typically is not trying to perform operations in respect of the touchscreen display 3. In other words, when the voice is not input to the microphone 7 during the call performed by the communication interface 9, the user may be trying to perform operation to the touchscreen display 3. Accordingly, there is a high probability that, by displaying an object when the voice is not input to the microphone 7, the necessary object is displayed at more appropriate timing for the user. That is, it is more convenient for the user.

Figure 7:
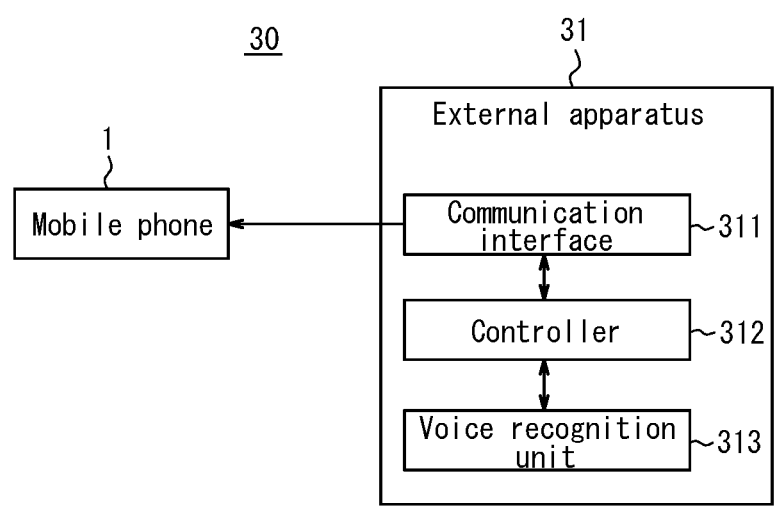
FIG. 7 is a functional block diagram illustrating a display communication system according to the present embodiment.

Although the controller 11 of the mobile phone 1 performs the voice recognition according to the above embodiment, this is not restrictive. For example, a communication system 30 that includes the mobile phone 1 and an external apparatus 31 may be configured as illustrated in FIG. 7. In this case, the external apparatus 31 includes a communication interface 311, a controller 312, and a voice recognition unit 313. The communication interface 311 receives the voice signal from a base station, and the controller 312 causes the voice recognition unit 313 to perform the voice recognition on the voice signal. Also, the mobile phone 1 receives information in a form converted by the voice recognition and displays the operation target object corresponding to the information. In this case, the mobile phone 1 does not need to perform the voice recognition and thus may display an appropriate object for the user with a small processing load.

The invention claimed is:

1. A mobile phone, comprising:
   a communication interface configured to transmit and receive a signal;
   a touchscreen display;
   a proximity sensor; and
   a controller, wherein
   when the communication interface receives a signal indicating a predetermined keyword during a call, the controller is configured to:
   determine whether the proximity sensor detects a predetermined object within a predetermined distance of the touchscreen display; and
   display an operation target object corresponding to the signal indicating the predetermined keyword on the touchscreen display, only when it is determined that the predetermined object is not within the predetermined distance of the touchscreen display, wherein
   the operation target object indicates a position on the touchscreen display where a user input can be made, and
   the controller determines whether the signal indicating the predetermined keyword is received by performing voice recognition.

2. The mobile phone according to claim 1, wherein the controller stops performing the voice recognition after displaying the operation target object.

3. The mobile phone according to claim 1, wherein the mobile phone comprises a microphone, and the controller stops performing the voice recognition when the microphone detects a voice.

4. The mobile phone according to claim 2, wherein the mobile phone comprises a microphone, and the controller stops performing the voice recognition when the microphone detects a voice.

\* \* \* \* \*